United States Patent
Beelitz et al.

(10) Patent No.: US 6,182,275 B1
(45) Date of Patent: *Jan. 30, 2001

(54) GENERATION OF A COMPATIBLE ORDER FOR A COMPUTER SYSTEM

(75) Inventors: Alan E. Beelitz, Austin; Paul J. Maia, Cedar Park, both of TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/012,962

(22) Filed: Jan. 26, 1998

(51) Int. Cl.[7] ....................................... G06F 9/45

(52) U.S. Cl. .................... 717/1; 707/4; 707/10; 707/104

(58) Field of Search ............... 395/712; 705/26; 717/11, 1; 707/4, 10, 104

(56) References Cited

U.S. PATENT DOCUMENTS

| 4,984,155 | * | 1/1991 | Geier et al. | 705/26 |
| 5,003,472 | * | 3/1991 | Perrill et al. | 705/15 |
| 5,544,040 | * | 8/1996 | Gerbaulet | 705/26 |
| 5,570,292 | * | 10/1996 | Abraham et al. | 364/473.01 |
| 5,665,951 | * | 9/1997 | Newman et al. | 235/375 |
| 5,808,894 | * | 9/1998 | Wiens et al. | 364/479.01 |

FOREIGN PATENT DOCUMENTS

| 2 234 097 | 1/1991 | (GB) | G06F/15/20 |
| 2 264 797 | 9/1993 | (GB) | G06F/15/20 |

(List continued on next page.)

OTHER PUBLICATIONS

Gateway 2000, Inc. (Hardest site to work through), Computerworld, v31, n46, p. 108, Nov. 1997.*

(List continued on next page.)

*Primary Examiner*—Tariq R. Hafiz
*Assistant Examiner*—Hoang-Vu Antony Nguyen-Ba
(74) *Attorney, Agent, or Firm*—Haynes and Boone, L.L.P.

(57) ABSTRACT

A system for specifying, ordering, and building a build-to-order computer system. After initiating an ordering session, a user such as a purchaser or designer is presented with a list of options such as a list of operating systems offered by a computer system vendor or manufacturer that may be implemented on a targeted computer system. After receiving an indication of a selection from a first list of options, the system accesses a computer system readable master data base to generate a second list of options such as software programs wherein each option of the second list is compatible with the selection from the first list. The master data base includes entries for every option offered by the computer system vendor or manufacturer and includes at least one tag indicating compatibly with other entries in the master data base. The system can be used to present to the user a plurality of lists wherein all of the options presented are compatible with the previous selections. The system writes indications of the selections in a data file. The data file is provided to manufacturing wherein the selections are implemented on a targeted computer system using the data file. The system may also include a sniffing feature used to determine particular hardware parameters of the targeted computer system. The system uses the determined parameters in generating the compatible lists of options. The system enables a purchaser to buy and order a computer system over a computer network such as the Internet.

23 Claims, 6 Drawing Sheets

FOREIGN PATENT DOCUMENTS

| | | | | |
|---|---|---|---|---|
| 2 301 206 | 11/1996 | (GB) | ............................. | G06F/17/50 |
| 2 329 052 | 3/1999 | (GB) | ............................. | G06F/11/00 |
| WO 98/10360 * | 9/1996 | (WO) | ............................. | G06F/17/50 |
| WO 98/10360 | 3/1998 | (WO) | ............................. | G06F/17/50 |

OTHER PUBLICATIONS

U.S. application No. 08/921,438, filed Aug. 29, 1997, "Database for Facilitating Software Installation and Testing for a Build–To–Order Computer System", Richard D. Amberg, Roger W. Wong, and Michael A. Brundridge.

U.S. application No. 08/920,773, filed Aug. 29, 1997, "Software Installation and Testing for a Build–To–Order Computer System", Richard D. Amberg, Roger W. Wong, and Michael A. Brundridge.

U.S. application No. 08/919,959, filed Aug. 29, 1997, "Software Installation and Testing for a Build–To–Order Computer System", Richard D. Amberg, Roger W. Wong, and Michael A. Brundridge.

* cited by examiner

| PART NUMBER | COMPATIBILITY TAG | DESCRIPTION FIELD |
|---|---|---|
| 01234 | WIN 95 | MS WORD 6.0 |
| 67890 | WIN 3.1 | MS WORD 3.1 |
| 99998 | DOS | WORD PERFECT DOS |

SDR TEXT FILE

| PREFIXES | TAG | PART NUMBER |
|---|---|---|
| SI SW | ENG | 01234 |
| HW | MEMORY | 16 2048 |

SHELL SCRIPT FILES

01234.SH
04521ENG.SH

GENERATION OF A COMPATIBLE ORDER FOR A COMPUTER SYSTEM

BACKGROUND OF THE INVENTION

CROSS-REFERENCE TO RELATED APPLICATIONS

This application relates to co-pending U.S. patent application Ser. No. 08/921,438, filed on Aug. 29, 1997, entitled "Database for Facilitating Software Installation and Testing for a Build-To-Order Computer System" and naming Richard D. Amberg, Roger W. Wong, and Michael A. Brundridge as inventors, the application being incorporated herein by reference in its entirety.

This application relates to co-pending U.S. patent application Ser. No. 08/920,773, filed on Aug. 29, 1997, entitled "Software Installation and Testing for a Build-To-Order Computer System" and naming Richard D. Amberg, Roger W. Wong, and Michael A. Brundridge as inventors, the application being incorporated herein by reference in its entirety.

This application relates to co-pending U.S. patent application Ser. No. 08/919,959, filed on Aug. 29, 1997, entitled "Software Installation and Testing for a Build-To-Order Computer System" and naming Richard D. Amberg, Roger W. Wong, and Michael A. Brundridge as inventors, the application being incorporated herein by reference in its entirety.

FIELD OF THE INVENTION

The present invention relates to computer systems in general, and more particularly to generating a compatible order for a build-to-order computer system.

DESCRIPTION OF THE RELATED ART

Computer systems are information handling systems which can be designed to give independent computing power to one user or a plurality of users. Computer systems may be found in many forms including, for example, mainframes, minicomputers, workstations, servers, personal computers, internet terminals, notebooks, and embedded systems. Personal computer (PC) systems, such as the International Business Machines (IBM) compatible PC systems, include desk top, floor standing, or portable versions. A typical PC system includes such hardware components as a processor, associated memory such as a RAM, control logic, and a number of peripheral devices that provide input and output for the system. Such peripheral devices often include floppy and hard disk drives, CD-ROM drives, network capability cards, terminal devices, modems, sound devices, voice recognition devices, electronic pen devices, and other mass storage devices such as tape drives and DVDs.

It has been known to install software programs and to perform tests on computer systems before they are shipped to businesses or individual customers. The goal of software installation and testing is to efficiently produce a useful, reliable computer system which may be delivered to businesses and individuals free from errors and ready to run. In general, testing detects and analyzes errors that occur in both the hardware and software portions of the computer system. A partial list of computer system hardware tests might include diagnostics upon hardware components such as a processor, memory, a storage device, an audio device, a graphics device, a keyboard, a mouse, and a printer. Software installation often includes loading a desired package of software programs onto the computer system, preparing appropriate environment variables for the computer, and preparing appropriate initialization files for the loaded software programs. Software testing often includes making sure that a desired version of software programs has been installed onto the computer system and that appropriate drivers are present on the computer system.

It has been known to specify software programs to be installed on a computer system. A computer file can be generated to indicate the software programs chosen or selected. Typically, the generated file is checked by a program or programs to determine whether the selected software programs for the targeted computer system are compatible. If the selected programs are incompatible, the program returns an error which requires the generation of a new file. Such a system adds to the inconvenience of ordering and specifying a computer system.

SUMMARY

It has been discovered that presenting to a user a list of options compatible with a previous choice made by user advantageously enables a system for specifying software programs and hardware components for a computer system to write to a compatible data file an indication of those selections.

In one aspect, the invention includes a method for specifying a computer system. The method includes presenting to a user via a user interface a list of a first plurality of options that may be implemented on a computer system and receiving an indication of a selected choice by a user from the first plurality of options presented to the user via the user interface. The method also includes generating a list of a second plurality of options that may be implemented on a computer system. Each of the second plurality of options is compatible with the selected choice. The method further includes presenting to the user via the user interface, the list of the second plurality of options.

In another aspect of the invention, a computer system includes a processor and a memory operably coupled to the processor. The memory includes a software program installed thereon. The software program is selected to be installed from a list of options. Each option of the list is compatible with an operating system installed on the memory. The operating system is selected previous to the selection of the software program. The list is generated by accessing a computer system readable data base which includes a plurality of entries. The data base includes an entry for each option of the list. The entry for each option of the list includes an indication of compatibility with the selected operating system.

In another aspect of the invention, a method for specifying a computer system includes providing to a user interface a first list of options, receiving from the user interface an indication of a selected choice from the first list of options presented to the user via the user interface, and generating a second list of options. The generating includes accessing a computer system readable data base. Each option of the second list is compatible with the selected choice. The method also includes providing to the user interface the second list of options and receiving from the user interface an indication of at least one selected choice from the second list of options presented to the user via the user interface. The method further includes writing to a computer readable data file an indication of the selected choice from the first list and writing to a computer readable data file an indication of the at least one selected choice from the second list.

In another aspect of the invention, a system for generating an order for a computer system includes a computer readable data base including a plurality of entries. Each entry representing an option capable of being implemented on a computer system. The system also includes means for providing a list of options to a user interface to be presented to a user via the user interface, means for receiving from a user interface an indication of at least one selected choice by a user from a list of options presented to a user via the user interface, and means for generating a list of compatible options that may be implemented on a computer system. Each of the compatible options is compatible with a previously selected choice by a user. The means for generating the list of compatible options reads the plurality of entries to determine whether an entry represents an option that is compatible with the previously selected choice. The system further includes means for writing to a computer system readable data file an indication of a selected choice. The means for providing provides the list of compatible options to the user interface. The means for receiving receives from the user interface an indication of at least one selected choice from the list of compatible options presented to a user via the user interface. The means for writing writes to the computer system readable data file an indication of the at least one selected choice from the list of compatible options.

Such a system or method advantageously presents the user with a list of options where every option is compatible or valid with a previously selected choice.

Another advantage is that the data file generated from the specifying or ordering session only includes compatible choices.

By presenting the user via a user interface with only compatible choices, the user does not have to be sophisticated in the language of computer equipment or computer software programs to be able to specify and/or order a build-to-order computer system. Thus, a computer system vendor incorporating the present invention does not have to employ highly trained sales staff. Also, such a system allows a computer system vendor to incorporate an automated system to sell build-to-order computer systems over a communications network, such as a push key telephone system, or over the Internet.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
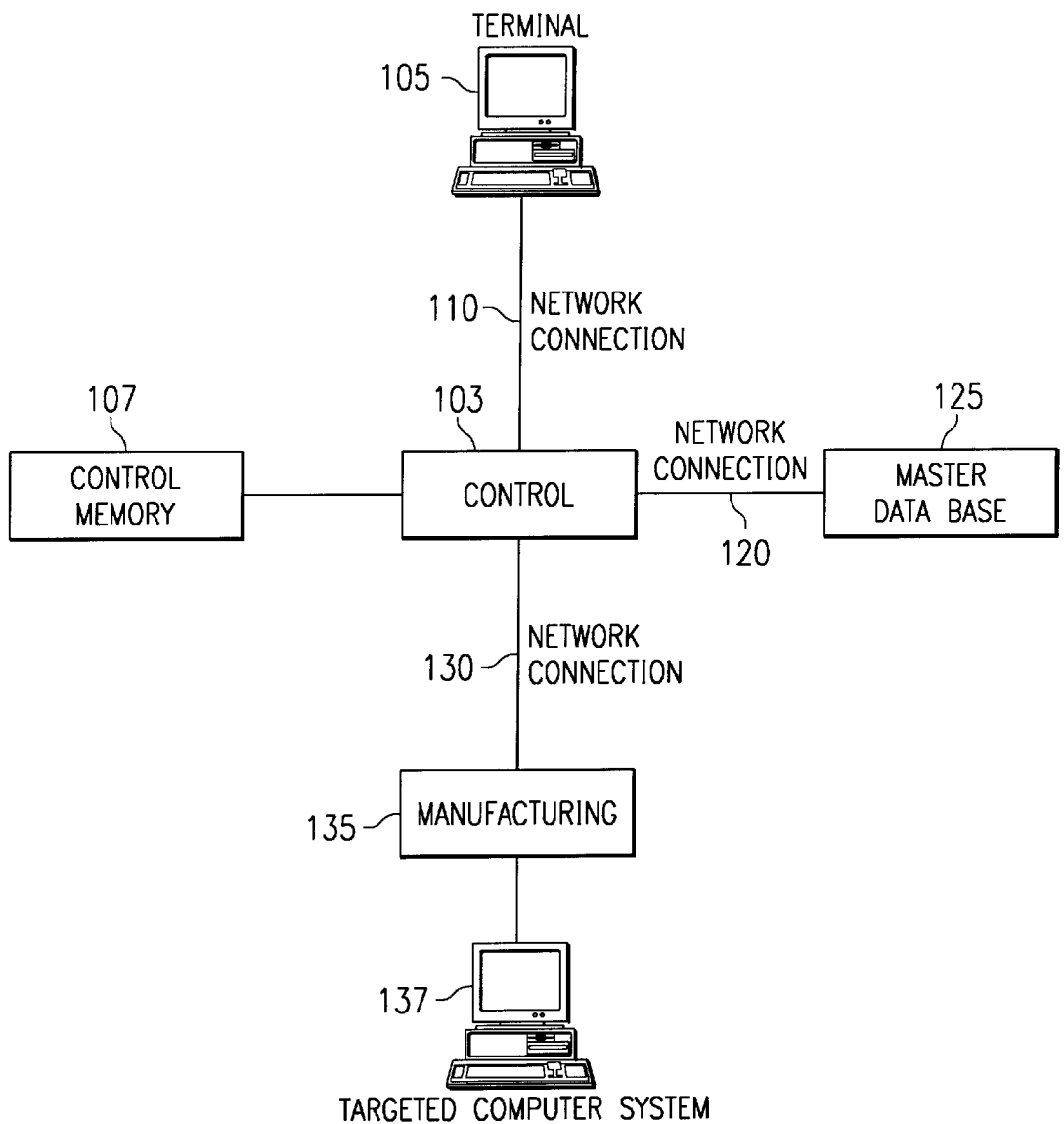
FIG. 1 is a block diagram of one embodiment of a system for generating a compatible order for a computer system and for building the computer system according to the compatible order.

FIG. 1 is a block diagram of one embodiment of a system for generating a compatible order for a computer system and for building a computer system according to the compatible order. The system includes a control computer system 103 having an associated control memory 107. Control computer system 103 (control) executes a computer program or programs designed to generate a computer readable data file that is used to manufacture a targeted computer system according to the specifications of a purchaser or designer of the targeted computer system. In the embodiment shown, a user such as a purchaser or designer places an order to buy a computer system via a user interface which in the embodiment shown, is a computer terminal 105. Terminal 105 accesses the control computer system 103 via a computer network 110, which in the embodiment shown, is a wide area network (WAN) such as the Internet or intranet. In one embodiment, terminal 105 executes an internet browser program. In other embodiments, terminal 105 may be coupled to control computer system 103 via a local area network (LAN). In other embodiments, the terminal is operated by a representative (employee or agent) of the computer system vendor who receives instructions from the consumer either in person or over the telephone. In other embodiments, the control computer system is a personal computer system and the user interface is the keyboard, display or monitor, and mouse of the personal computer system. In other embodiments, a user such as a purchaser may enter their choices via a user interface such as a telephone that is operably coupled to control via a telephone network.

After receiving an indication via the network connection 110 from terminal 105 that a customer desires to purchase a computer system, control 103 accesses a master data base 125 via a network connection 120 to generate a list of options available for a build-to-order computer system as offered by the manufacturer or computer system vendor. The control computer system 103 then provides the list via the network connection 110 to the terminal 105 where, in the embodiment shown, the list is displayed on the terminal screen. After the user makes a selection from the list, an indication of that selected choice is sent back to the control computer system 103. The control computer system 103 then accesses the master data base 125 to generate a second list of options wherein each option of the second list is compatible with the previous selection. The control computer system then provides the second list to terminal 105 via the network connection 110 to enable the user to select from a list of options that are compatible with the previous selection.

Presenting a user with a list of options that are compatible with a previous selected choice advantageously allows a user to select from only those items that are compatible with the previous choice. This advantageously eases the convenience of ordering or specifying a computer system on the user in that the user does not have to remake a selection in the event that a previous choice is incompatible. It also saves the user time in that a user does not have to agonize over options that are not compatible with a previous choice.

Furthermore, the orders generated are compatible as of the completion of the ordering or specifying session with the purchaser. Thus, a computer system vendor does not have to reinitiate a specifying session if the initial order is later determined to be incompatible.

After the control computer system 103 has provided a list of compatible options to the user interface 105 and after the user has made the selections from the list of compatible options, the control computer system 103 indicates in a computer system readable data file or system descriptor record file in control memory 107 the choices made by the user on terminal 105. In one embodiment, the data file is a text file. In some embodiments, the data file includes an indication of the purchaser's name and address as provided via the user interface 105.

The control computer system 103 provides the data file via a network connection 130 to manufacturing 135. Manufacturing 135 is typically located at the plant or manufacturing facility where the computer systems are assembled. The data file is used to manufacture a targeted computer system as per the selections made by the user as indicated in the data file. In one embodiment, the data file generated by the control computer system 103 is used to generate other files used in manufacturing targeted computer systems. For example, see "SOFTWARE INSTALLATION AND TESTING FOR A BUILD-TO-ORDER COMPUTER SYSTEM", Ser. No. 08/919,959, filed Aug. 29, 1997, with Richard D. Amberg, Roger W. Wong, and Michael A. Brunbridge named as inventors, which is hereby incorporated by reference in its entirety. In another embodiment, the data file is loaded directly onto a data server in manufacturing 135. When the targeted computer system 137 first boots up, it loads software and performs other operations and instructions as per the data file.

In one embodiment, manufacturing 135 includes a computer program called a "parser" that reads the indications or entries in the data file and associates executable shell script files located in manufacturing 135 with the indications or entries in the data file. The parser may also execute the shell script programs to execute the installation of the operating system software application programs, or other application programs on the targeted computer system 137. In one embodiment, the shell script files are stored on the master data base wherein the computer system executing the parser program has access to the master data base 125.

In one embodiment, the data file would be sent electronically via network connection 130 to manufacturing 135. In other embodiments, the data file would be printed out wherein a person in manufacturing 135 would manually enter the choices during the manufacturing process.

In the embodiment shown, master data base 125 is located on a server that includes a plurality of drives. In one embodiment, the master data base 125 is a computer system readable data base that includes an entry for every software program and hardware component option offered by a computer system manufacturer or vendor for a build-to-order computer system. In some embodiments, the master data base 125 also contains an entry for each implementation operation such as installation programs, hard disk drive formatting operations, and testing operations for implementing the hardware components and software programs on a computer system. These entries may be located in different files in the master data base 125. In one embodiment, the master data base is realized as a flat file.

Figures 7, 8A, 8B, 8C:
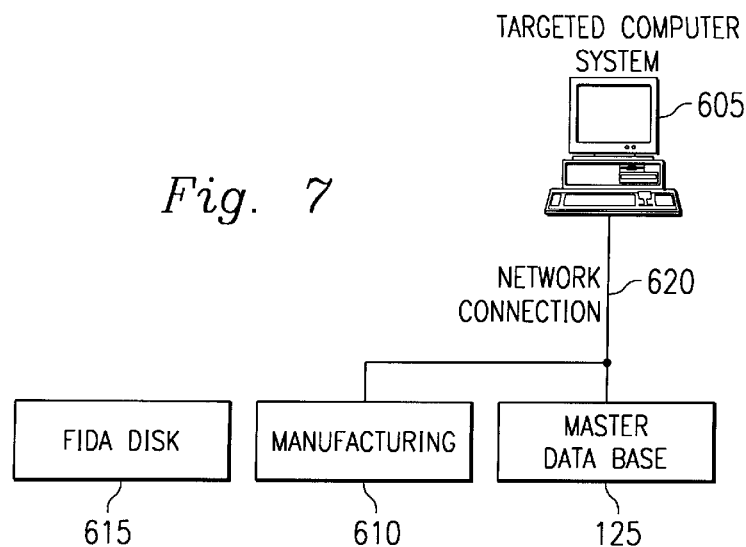
FIG. 7 is a block diagram of one embodiment of a system for generating a compatible order for a computer system and for configuring the computer system according to the compatible order.
FIG. 8A is an alpha-numeric representation of one embodiment of entries in a computer readable data base.
FIG. 8B is an alpha-numeric representation of one embodiment of a computer readable data file.
FIG. 8C is an alpha-numeric representation of one embodiment of a computer readable file used in implementing selected choices.

Each entry in the master data base 125 includes a manufacturer specific part number or identification field with each individual hardware components, software programs, or installation operations having a specific number. Each entry may also include a description field that indicates text to be displayed on the user interface of terminal 105 when the entry is presented to the user. FIG. 8A is an alpha-numeric representation of one embodiment of entries in a parts file located in the master data base.

Each entry in the master data base also includes at least one tag or tag field. A tag or tag field is an indication used to define a characteristic associated with a particular part number of a database entry. These tags are used to categorize each entry and to indicate compatibility with other hardware components and software programs listed in the master data base 125. The control computer system 103 reads tags to generate the list of options to be presented to the user interface that are compatible with a previous selection or selections. For example, each software program application entry includes a tag field which indicates its compatibility with a particular version and language of an operating system type. In other embodiments, each operating system type may contain a tag that indicates its compatibility with a specific processor. In some embodiments, the entries for the operating systems may include a tag indicating a size of RAM required for the operating system. In some embodiments, each entry for a software program application may have a tag that indicates that the program requires a particular part as a prerequisite for its implementation.

The tags in the master data base can also be used to indicate to control that other operations need to be performed by control based upon a previous selected choice by the user. Also, a tag or tag field may be used to indicate that the computer system vendor offers a variety of options for a particular entry (either a software program, or hardware component, or implementation operation). Consequently, when the control computer system reads the tag, it then knows to create a list of options for the particular entry if that entry is selected. For example, the entry for an operating system may include a tag that indicates that the vendor offers a standard disk format or an alternative disk format with the operating system. To create this list, the control computer system scans the master data base to look for other tags of a particular type to construct a list of disk format alternatives. Consequently, the tag indicates to the control computer system that other options need to be presented to the user via the user interface and that the user needs to select an option. In other embodiments, the tags would indicate what hardware components, software programs, installation instructions or operations, tests, and other implementation operations are required for the implementation of the entry onto a computer system. In one embodiment, the particular tag would indicate to control to go to another data base to perform a particular function such as loading text onto the data file from another data base. Tags may also be used to indicate that an entry is incompatible with other entries.

Although in FIG. 1, only one control computer system 103 is shown accessing the master data base 125, in other embodiments, multiple control computer systems can access the master data base 125 to conduct ordering or specifying sessions with a plurality of users. In one embodiment, the control computer systems are personal computers of the inside sales staff of a computer system vendor. One advantage of having one central master data base is that the lists generated by the control computer systems are compatible and up-to-date. Furthermore, having a master data base allows for the easy update of the system in offering new computer hardware components and software program applications. For a vendor to offer a new software program or hardware component, a new entry, including tags to indicate compatibility with other entries, is created on the master data base. The specifying programs run by the control computer systems do not have to be updated in order to offer a new component, operation, or program.

In another embodiment, the control program is stored on the master data base or other data base and is downloaded to the control computer system RAM prior to the initiation of an ordering session or groups of ordering sessions.

In the embodiment shown, the targeted or specified computer system 137 is a computer system on which the selections made by the user as indicated by the user interface 105 are implemented. In the embodiment shown, the computer system is a personal computer system. In other embodiments, other types, forms, or versions of computer systems may be specified and built such as laptop computers, servers, internet terminals, embedded systems, or workstations.

The system of FIG. 1 is a convenient system for allowing a purchaser to order a build-to-order computer system and for a manufacturer to build the computer system as specified.

FIGS. 2–5 are flow diagrams showing steps for generating a compatible order for a computer system and for building the computer system according to that order. These flow diagrams are executed by the control computer system 103 and, in one embodiment, are stored in the control memory 107. In one embodiment, the flow diagrams are implemented by a computer program written in the C programming language. In step 201, the control computer system 103 receives an indication from a user interface 105 indicating the desire to purchase a computer system. This occurs, for example, when a purchaser accesses the computer system vendor's web site via the Internet and activates a button to initiate a specifying or ordering session.

Figure 2:
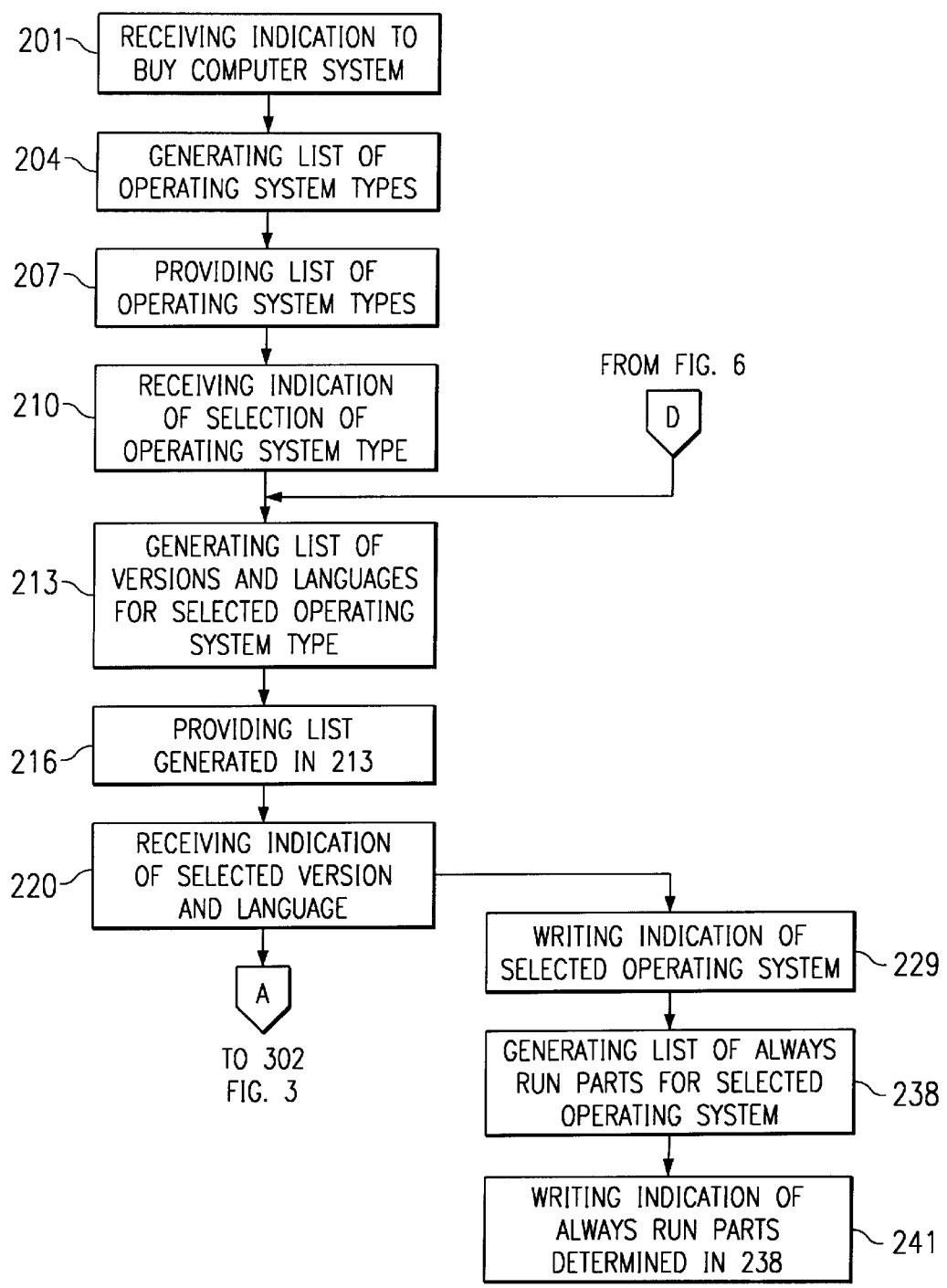
FIGS. 2–6 are flow diagrams showing steps for generating a compatible order for a computer system and for building the computer system according to the compatible order.

In step 204, control 103 accesses the master data base 125 to create or generate a list of operating system types available for the targeted computer system. To generate a list of operating system types, control reads the tags of the entries of the master data base 125 and looks for those entries with an initiating tag. This initiating tag indicates that these entries should be selected first in the specifying process. In the embodiment shown in FIG. 2, each entry for an operating system has an initiating tag since the program of FIG. 2 starts the specifying process with the selection of an operating system. For those entries with the initiating tag, control reads the group or type tag to create a list of the types or groups. In the embodiment of FIG. 2, control reads the operating system type tag and creates or generates a list of every type of operating system that appears in the master data base. Consequently, a particular type of operating system will appear in the first list as long as the master data base has at least one entry having a tag indicating that the operating system represented is of that particular type.

In step 207, control 103 provides to the user interface 105 a list of the operating system types available. Upon seeing the list presented on the terminal screen, the user selects an operating system type. In step 210, control 103 receives from the user interface 105 an indication of the selected type of operating system from the list created in step 204. In step 213, control accesses the master data base 125 to generate a list of versions and languages available for the selected operating system type. In one embodiment, this list includes every operating system whose entry has the tag of the selected operating system type.

In another embodiment, the entries for all of the operating systems listed in the master data base include a version tag. In this embodiment, the second list presented to the user would include all of the versions offered for the selected operating system type. Those versions on the second list are determined by the version tags for the entries having the selected operating system type tag. Consequently in this embodiment, a particular version would appear on the second list if there is at least one entry that has both the tag of the selected operating system type and the tag of the particular version. After receiving from the user interface an indication of which version is selected, control would access the master data base to create a third list (step not shown). This third list would include all operating systems that have the tag of the selected operating system type and of the tag of the selected version. This third list would represent all of the languages offered by the computer system vendor for the selected version of the selected operating system type.

Examples of versions and languages and of an operating system type are versions ORS2 and ORS2.1 and languages ENG (English) and KOR (Korean) for the operating system offered under the trade designation WINDOWS 95 by MICROSOFT CORPORATION.

In step 216, control 103 provides the list of the versions and languages offered for the selected operating system type to the user interface 105. The user selects from the list presented via the user interface 105, the desired language and version of the selected operating system type, and indicates the desired selection on the user interface. In one embodiment, the user interface includes a mouse or other type of pointer control device to highlight and select the desired choice. In other embodiments, the user would type in the desired choice with a keyboard. In other embodiments, the user interface presents the lists via a menu system. In other embodiments, the lists are presented using a text based windowing system. The user interface 105 then provides the selected choice to control 103 via the network connection 110.

After receiving from the user interface 105 an indication of the selected version and language of the selected operating system type (the selected operating system) in step 220, control 103 creates and writes to a computer system readable data file located in control memory 107, an indication of the selected version and language of the selected operating system type. In one embodiment, this data file is a system descriptor record (SDR) file. In one embodiment, the indication that is written to the data file includes the specific part number for the selected version and language of the selected operating system type. Associated with the part number is a prefix indicating that the selection is an operating system. In one embodiment, an identifying tag may be associated with the part number. This identifying tag would be used to indicate the version and/or language of the operating system. FIG. 8B is an alpha-numeric representation of one embodiment of an SDR file.

In step 238, control 103 determines if there are any "always run parts" associated with the selected version and language of the selected operating system type. Associated always run parts for a selected choice are software programs, installation operations, testing operations, or other implementation operations that are required for or that the manufacture always performs or implements with the implementation of the selected choice on a targeted computer system. Examples of associated always run parts for the selected version and language of the selected operating system type include required patches, required hard drive preparation operations, and tests to be performed on the targeted computer system before and/or after the selected operating system has been installed.

In one embodiment, control generates a list of always run parts by reading the tags in the master data base 125. In one embodiment, the entries for each version and language of an operating system would include a tag or tag field indicating that an always run part is associated with a specific version and language of the operating system. In other embodiments, the entries in the master data base for each of the always run parts have a tag that indicates that the always run part is associated with the selected operating system. In other embodiments, the entry for each operating system contains a tag that indicates to control to access another data base or another portion of the master data base 125 to obtain a list of always run part for that particular operating system.

In other embodiments, the list of always run parts is generated by control accessing a dependency file. A dependency file is a computer system readable file that includes "expressions" containing part numbers and/or prefixes that identify instructions or operations to be performed, information required by an instruction or operation, or programs to be installed if an entry in an SDR contains the part numbers and prefixes contained in the expression. Control compares the part number, prefixes, and/or identifying tags of each selection indicated in the data file with the expressions in the dependency file to generate a list of always run parts associated with the selected version and language of the selected operating system type. In some embodiments, accessing the dependency file may cause control to generate and provide additional lists of options to the user interface based upon a previous selection or selections. The dependency file may be located on the master data base or on other data bases.

In step 241, control 103 writes an indication of the list generated in step 238 to the data file in memory 107. In writing an indication to the data file, control also associates prefixes with the part numbers and writes the prefix and part number in the data file.

Figure 5:
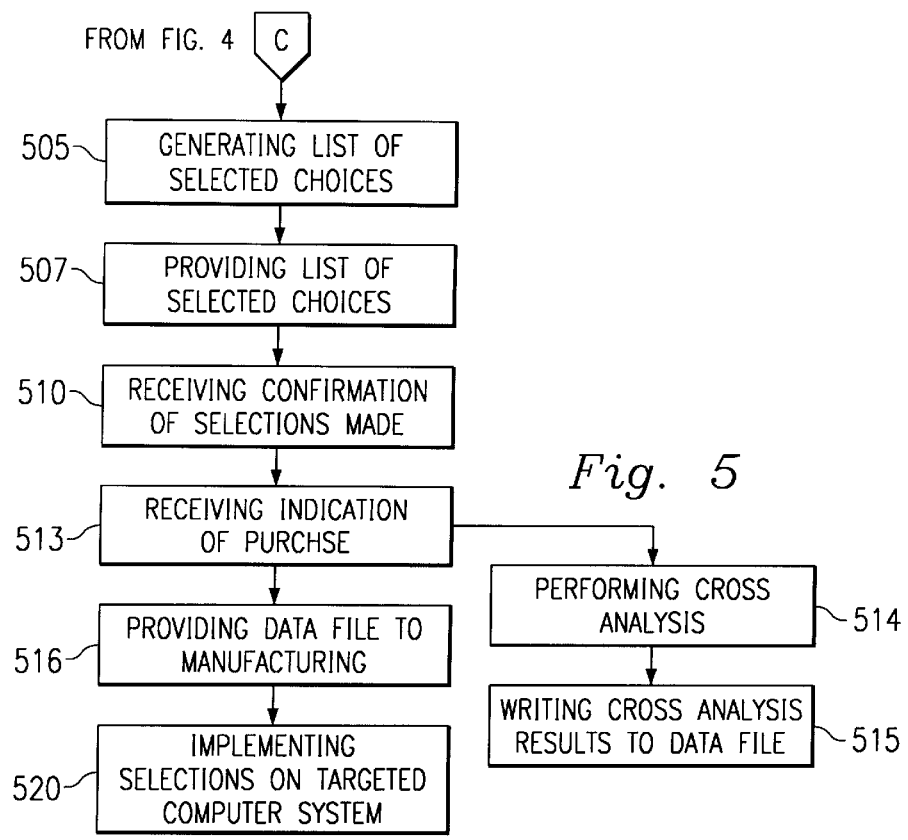

Although the embodiment of FIG. 2 shows that steps 238 and 241 are performed after step 220, in other embodiments, they may be performed after the user has completed their entire ordering or specifying session such as after step 513 on FIG. 5. In other embodiments, the list of always run parts may be generated by the execution of another program such as a parser program located in manufacturing. The parser would read the part numbers and prefixes of each entry in the data file to generate a list of always run parts associated with each entry.

Figure 3:
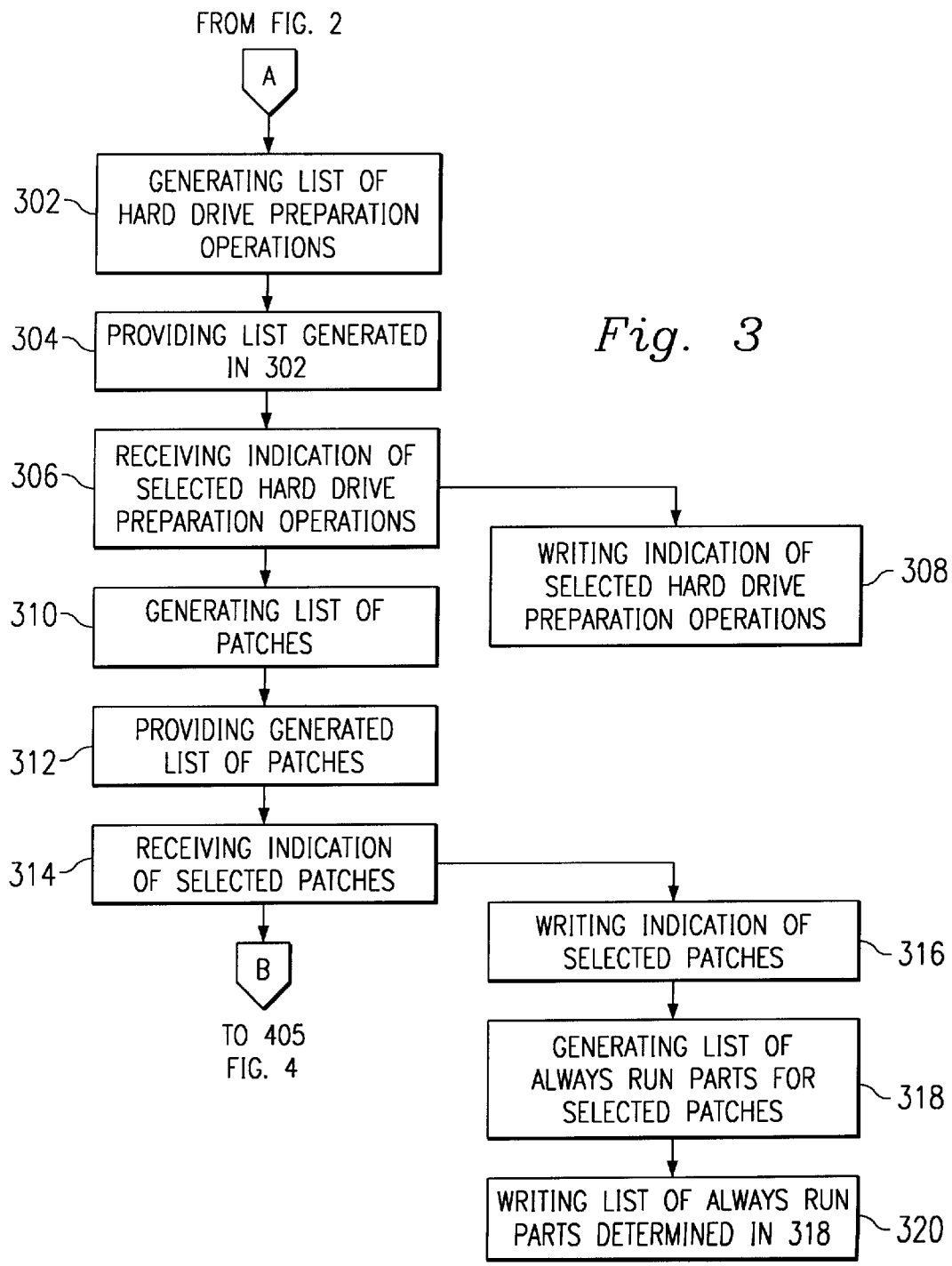

Referring to FIG. 3, after step 220 in FIG. 2, control transfers to step 302 where control generates a list of hard drive preparation operations available for the selected version and language of the selected operating system type. For example, a user may be presented with the option of implementing a "suspend-to-disk" operation or the option of implementing a utility partition of the hard drive in the targeted computer system. In one embodiment, control generates the list of hard drive preparation operations by reading the entries in the master data base 125. The entries in the master data base for the hard drive preparation operations each include at least one tag indicating that the entry is for a hard drive preparation operation and at least one tag indicating its relationship to the various operating systems. This list is generated by control reading the relationship tags of the entries to determine if the preparation operation is optional or required for the selected version and language of the selected operating system type. However, if the hard drive preparation operation is required with the selected version and language of the selected operation system type, then the operation is considered an always run part and an indication of the operation will automatically be made in the data file in step 241 without informing the user. After providing the list created in step 302 to the user interface, a user selects from the list presented via the user interface, the desired hard drive preparation operations. Control receives an indication of those selections in step 306. Those selections are then indicated in the data file in step 308 by control writing the part number and appropriate prefix of the operation in the data file.

In another embodiment, the list of optional hard drive preparation operations is generated by control accessing a dependency file after the selection of the language and version of the operating system type is made by the user. Control compares the entry for the selected operating system (including part number, tags, and prefixes) with the expressions in the dependency file to generate the list of optional preparation operations to be provided to the user interface for presentation to the user.

In step 310, control generates a list of patches available for the selected version and language of the selected operating system type. Patches are software programs that are available for a selected choice that correct a problem with a specific choice or enhance the performance of the selected choice. For example, if an operating system provider provides the operating system with the Direct Memory Access (DMA) deactivated, the computer system vendor may offer a patch to activate the DMA to improve performance. In other embodiments, patches may be used to implement the selected version and language of the selected operating system type with a particular hardware component that was selected by the user in a previous choice. However, if a patch is required, then the patch would be considered an always run part and an indication of the patch would be written to the data file in step 241 of FIG. 2.

In one embodiment, control generates the list of patches by reading the entries in the master data base 125. In one embodiment, the entry for the selected operating system includes a tag that indicates that a patch software program is optional with the selected operating system. In other embodiments, each patch would have an entry in the master data base wherein each patch entry includes at least one tag indicating the operating system or operating systems for which the patch program is an option. In some embodiments, the entry for each patch contains a description field. This description field indicates to the control computer system that a textual message is to appear on the screen of a user interface with the patch to inform the user of the purpose of the patch. In some embodiments, the description field may direct control to access another file at a particular location in the master data base to obtain the text to be displayed.

In another embodiment, the list of optional patches for the selected operating system is generated by control accessing a dependency file and comparing the expressions of the dependency file with the entry in the SDR for the selected operating system.

In some embodiments, control generates a list of always run parts (either by accessing entries in the master data base 125 or accessing a dependency file) associated with the selected the hard drive preparations operations and writes an indication of the list of always run parts to the data file.

After a list of the patches is provided to the user interface in step 312, the user selects the desired patches from the list of patches presented by the user interface. Afterwards, an indication of the selected patches is provided by the user interface to control in step 314. In step 316, control writes an indication of the selected patches to the data file where the part numbers of the selected patches and the appropriate prefixes are written to the data file.

In step 318, control generates a list of always run parts associated with the selected patches. In step 320 control writes that list to the data file. Control generates the list of always run parts by accessing entries in the master data base 125 by or accessing a dependency file. In other embodiments, control 103 may complete steps 318 and 320 after the completion of the specifying session with the user. In other embodiments, steps 318 and 320 may be completed by other computer systems in manufacturing.

Figure 4:
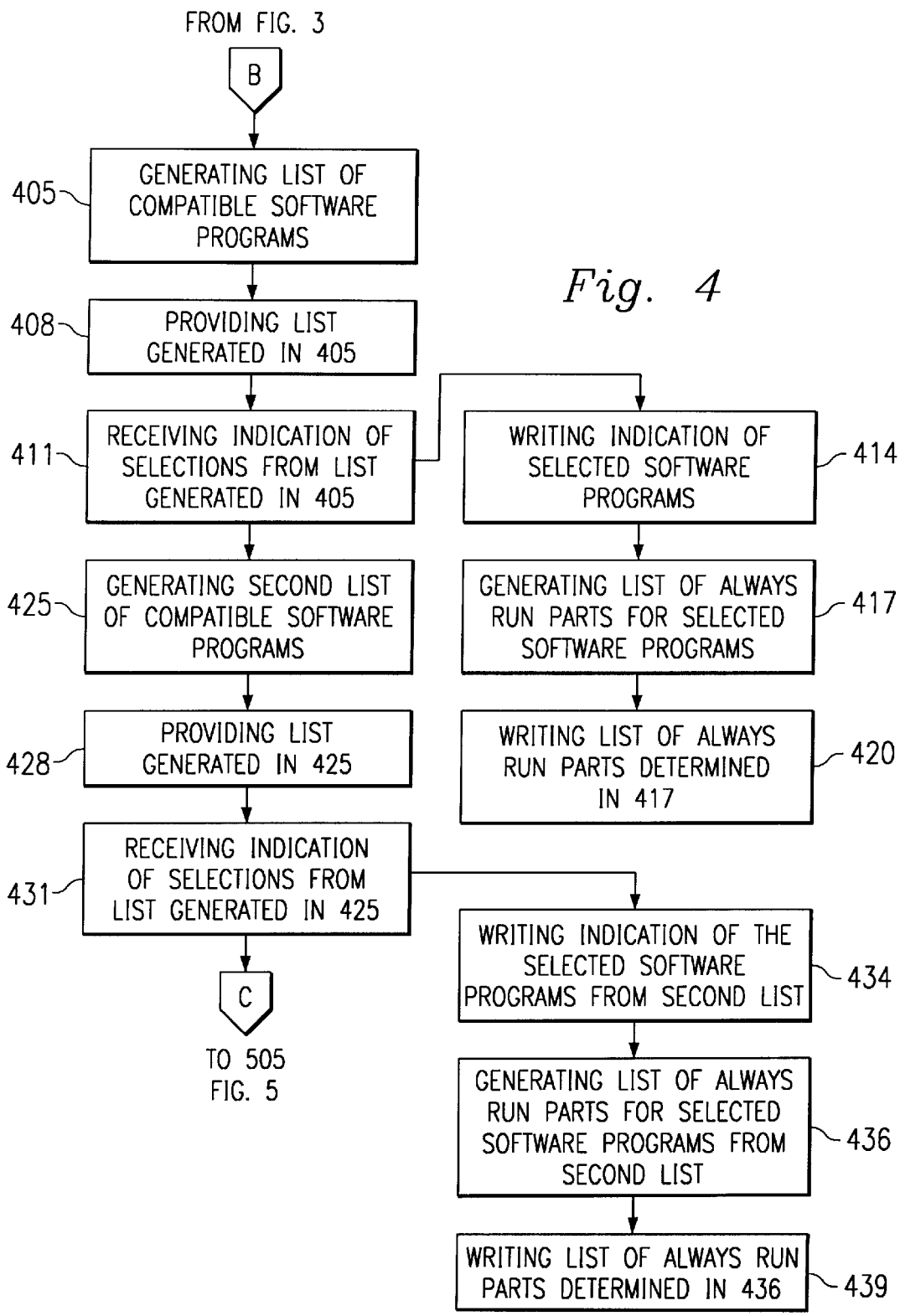

Referring to FIG. 4, in step 405, control 103 accesses the master data base to generate a list of computer software programs that are compatible with the selected version and language of the selected operating system type. Control generates this list by reading, in the master data base, the associated tags of the software program entries. In one embodiment, an entry for a compatible software program contains a specific tag indicating compabtibility with the selected operating system version or the selected operating system type. After providing the list to the user interface in step 408, the user selects from the list presented by the user interface, the software programs to be installed on the targeted computer system.

In some embodiments, the lists of software programs provided to the user interface are broken up into different sub-lists or sub-menus. For example, a first sub-list may include a list of compatible word processing programs such as MICROSOFT WORD™ or WORDPERFECT™. Another sub-list would include computer games offered by the computer system vendor. It is understood that a variety of sub-menus classifying different software programs may be presented. For instance, internet access programs, spreadsheets, and drawing programs may be presented in different sub-menus. Breaking the list of available programs into sub-menus aids the user in selecting software programs. In one embodiment, each entry for a software program would include a tag field or tag indicating the type of software program. Control would read these tags and generate the sub-menu lists according to the software type tags. In another embodiment, each different group of software programs would be stored in a different logical section of the data base. Control would generate each sub-menu list by reading only one logical section of the data base at a time. In this embodiment, every entry in a logical section of the master data base having a tag indicating compatibility with the selected operating system would be presented in the sub menu list.

After the user selects the software programs to be installed on their targeted computer system, the user interface 105 returns an indication of those selections to control in step 411. In step 414, control writes an indication of those selections to the data file by writing the part number and associated prefixes of the selected software program in the data file.

In step 417, control generates a list of always run parts associated with the selected software programs. In step 420 control writes that list to the data file. Control generates the list of always run parts by accessing entries in the master data base 125 by or accessing a dependency file. In other embodiments, control 103 may complete steps 417 and 420 after the completion of the specifying session with the user. In other embodiments, steps 417 and 420 may be completed by other computer systems in manufacturing.

In step 425, control accesses the master data base to generate a second list of computer software programs that are compatible with both the selected version and language of the selected operating system type and with any or all of the previously selected software programs. In one embodiment, the tags of each of these programs would include at least one tag indicating compatibility with the selected operating system type and with the selected software program. Control 103 provides the list generated in step 425 to the user interface in step 428. The user selects the software programs from the second list presented by the user interface. The second list may include correctional patches for the individual software programs selected from the first list of software programs, or it may include optional computer programs that upgrade or enhance the performance of the selected programs. For example, a filter program may be offered with a particular word processing program that converts documents generated by another type of word processing program to the format of the particular word processing program. However, if a selected software program is required by a previously selected computer program, then those required applications are considered always run parts for the selected software program and an indication of that program is written to the data file in step 420.

In step 431, control receives from the user interface, an indication of the selected software programs from the second list generated in 425. Control writes an indication of those selections to the data file in step 434 where the part numbers and associated prefixes are written to the data file.

In step 436, control generates a list of always run parts associated with the selected software programs from the second list. In step 439, control writes that list of always run parts to the data file. Control generates the list of always run parts by accessing entries in the master data base 125 or by accessing a dependency file. In other embodiments, control 103 may complete steps 436 and 439 after the completion of the specifying session with the user. In other embodiments, steps 436 and 439 may be completed by other computer systems in manufacturing.

Referring to FIG. 5, after the software program selections are made in FIG. 4, control transfers to step 505, where it accesses the data file to generate a list of all of the previously selected choices as indicated by the data file. This list reflects all of the selections made by the purchaser or user and reflects the type of computer system that will be built by the manufacturer. In step 507, control provides the list to the user interface 107 which presents the list to the user, where the user can then approve or disapprove of the choices made. If the user does not agree with a selection, the user can send an indication to control to "move backwards" in the program to the selection that the user objects to and ask for a re-selection of the part. Upon receiving an indication for the re-selection of a particular part, control re-presents the list that included the selected part either by locating in control memory 107 the saved list or by reading the previous choices from the data file to return to the preceding step that generated the list. All subsequent selections from the objected choice would be voided. Control would proceed from the point in the program where the new choice is made to ensure that all subsequent choices are compatible with the new choice.

If the user agrees with the selections, the user selects a confirmation button on the terminal screen of the user interface. Afterwards, in step 513, the user interface sends an indication that the user desires to purchase the specified computer system or that the purchase has been made. In one embodiment, this would include the user entering their credit card number into the user interface. At which time the specifying session with the user is complete.

After step 513, control accesses a dependency file to perform a cross analysis of the selections made. During this cross analysis, control compares the expressions in the dependency files to determine if any always run parts are associated with combination of selections made. For example, if the user selects a FAT32 file system and an electronic seal, and has not already selected the utility partition, then control, after reading the dependency file, would write to the SDR file an indication to install the utility partition on the computer system due to the selection of both a FAT32 file system and an electronic seal. In this example, the expression that indicates the implementation of the utility partition includes the part numbers and/or prefixes for both the FAT32 file system and the electronic seal.

In some embodiments, the cross analysis step may generate a list of options to be presented to the user based upon a combination of selections made. In these embodiments, the cross analysis step would be performed before step 505. In these embodiments, control would provide the list to the user interface. After the user has selected via the user interface, particular options generated from the cross analysis, the user interface would send an indication of those selections back to control wherein control would write an indication of the selections to the SDR file.

In other embodiments, control may perform some of the steps shown in FIGS. 2–4 after the specifying or ordering session with the user has been completed (after step 513). In one embodiment, control generates the always run parts (steps 238, 318, 417, and 436) for each selection or entry after the specifying session has been completed.

In some embodiments, control generates and writes to the SDR file a list of always run parts that are implemented in every computer system that a computer system vendor makes. In one embodiment, the entry for each of these always run parts includes a tag indicating that the part is to be automatically implemented in a computer system.

Although in FIGS. 2–5, only two lists of compatible software programs are generated, it is understood that several lists of compatible software programs and other lists of compatible options may be generated and presented to the user during the specifying session.

In the embodiments shown in FIGS. 2–5, the data file generated by control is an SDR file. An SDR file is a computer readable text file that includes an entry or line for each hardware component, software program, patch, or other operation to be implemented on the targeted computer system 137. Each entry of the SDR includes the manufacturer's specific part number and associated prefix for the item represented. In some embodiments, the associated prefixes identify the type of part, program, or component that the entry represents. In some embodiments, each entry may include an identifying tag. An SDR file is formatted to be transferred to and read by another computer system in manufacturing 135 that executes a parser computer program to build the computer system as per the data file. The SDR file would also include customer specific information such as the name and address of the computer purchaser.

In another embodiment, the data file generated by control during the specifying session is a BAR file. A BAR file contains indications of selections made and of always run parts associated with those selections, but is in a different format than an SDR file. This different format enables control to conduct the specifying session more quickly. After the specifying session is completed, the BAR program is converted into an SDR program by control or other computer system executing a converter software program such as an SDR generator program.

In another embodiment, control inputs a BAR file containing specifications for a specific computer system and enters those specifications into the SDR data file during the specifying session. For example, control may have access to several BAR files (located in another portion of the master data base 125 or in other data base) wherein each BAR file contains the hardware default specifications for a particular model of computer system offered by the computer system manufacture. The user may be initially asked to choose a model from a list of models available. After receiving an indication of the model chosen from the user interface 105, control accesses the corresponding BAR file for that model and converts those specifications into the SDR file. Afterwards, control executes the specifying program of FIGS. 2–4 wherein the user specifies the operating system and software programs. However, because the SDR contains entries for the hard ware components specified in the BAR file, the choices presented to the user in FIGS. 2–4 are also compatible with the hardware components as specified in the BAR file. In some embodiments, control presents the components as specified in the BAR file as default selections and allows the user to make changes to the default selections.

In some embodiments, control generates from the data file an alpha numeric text file that is readable by humans such a purchase order which is sent to a manufacturing plant to be manually entered into the manufacturing process.

Because a compatible or valid system descriptor file or data file is generated, special programs do not have to be run by manufacturing 135 to determine if the specified components or programs are legal or compatible.

In step 516, control provides the data file to manufacturing 135 which in step 520 uses the data file to implement the selections as per the data file. In one embodiment, another computer system in manufacturing (internal to manufacturing 135) executes a parser software program that associates an executable shell script file with each entry of the SDR and executes the shell script file in implementing the entry on the targeted computer system 137. Thus, the selected operating system, selected software programs, selected patches, selected hard disk drive operations, the determined always run parts, and other selections are installed, implemented and tested by the execution of the associated shell script files. The parser program scans through the system descriptor record line by line and associates a shell script file with each part number. The parser program executes the shell script files by supplying or turning over the shell script files to a script processing program. The script processing program interprets the instructions of the shell script files and acts upon those instructions to perform the actual instructions for the installation or implementation of the part on the computer system. In some embodiments, the parser program may also generate and attach a suffix to a particular part number. The parser program generates the suffix by reading the identifying tag of the SDR entry or by accessing tables with the part number. FIG. 8C is an alpha-numeric representation of a computer system readable file containing a list of shell scripts files.

In one embodiment, the data file provided to manufacturing includes the actual instructions for implementing the selected version and language of the selected operating system type, the selected patches, the selected software programs, and also instructions for installing the software programs. The data file also includes the instructions for performing the installation operations. These additional instructions are added to the data file by control after the specifying session.

In one embodiment, the targeted computer system is connected through a network card to a server in manufacturing. The targeted computer system 137 is initially booted up to perform the operations and instructions as per associated shell script files to load the selected programs onto its hard drive and to run the tests. In one embodiment, the selected software programs and operating system can be down loaded and installed on the targeted computer system via the Internet.

In other embodiments, the data file may be used to create a floppy disk, which would be used to boot up the targeted computer system in the manufacturing process and install the selected programs and components on the targeted computer system.

In other embodiments, manufacturing 135 would use the data file to write to a floppy disk or CD ROM a duplicate set of selected software programs. This disk would also include the installation instructions and operations to load the programs from the CD ROM to the hard drive. Such a feature would advantageously provide a back up to the hard drive of the targeted computer system and, in the event of a hard drive crash, provide a convenient system to reprogramming the hard drive according to the selections specified.

In the embodiments shown in FIGS. 2–4, the user or purchaser would specify the hardware for the targeted computer system during the ordering session. In some embodiments, the creation of the lists of software options is not dependent upon the hardware specified.

Figure 6:
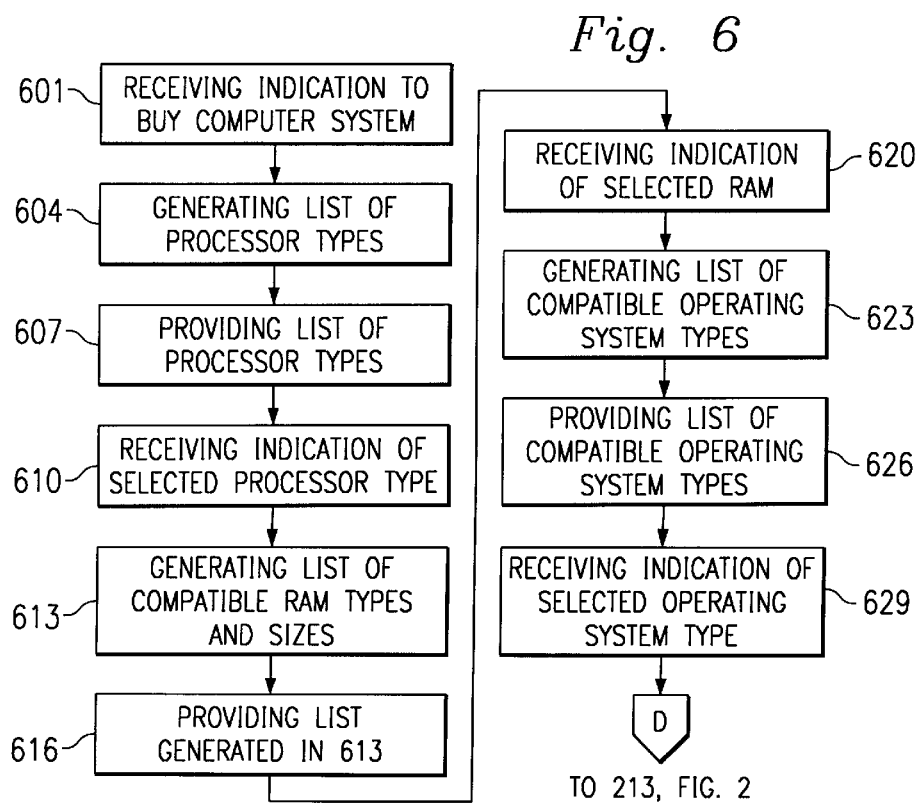

FIG. 6 is a flow diagram showing steps that enable a user to specify both compatible hardware components and software programs for the targeted system. In step 601, control 103 receives an indication from a user interface that a purchaser wishes to buy a build-to-order computer system. In step 604, control accesses the master data base 125 to generate a list of central processor units (CPU) offered by the computer system manufacturer in a targeted computer system. This list is generated by the control computer system 103 reading the tags in the master data base 125. Each CPU offered by the computer system vendor has an entry in the master data base that includes a manufacture specific part number and associated tags. In the embodiment of FIG. 6, the tags for each processor would include an initiation tag. Every CPU whose entry includes an initiation tag would be presented in the first list. In other embodiments, each processor entry includes a type tag where the first list presented to the user would be the types of CPUs offered by the computer system vendor.

In step 607, control provides the list to the user interface 105. The user selects a desired CPU from the list displayed on the terminal screen. For example, the vendor may offer a variety of X86 compatible processors, such as processor offered under the trade designation of PENTIUM™, PENTIUM II™, or PENTIUM PRO™ by the INTEL CORPORATION.

After the user has selected a CPU, the user interface 105 provides an indication of the selected CPU to control. In step 613, control accesses the master data base 125 to generate a list of RAM sizes and types that are available and compatible with the selected CPU. The entries for each RAM include at least one tag indicating compatibility with a CPU. The list generated would include each RAM whose entries include a tag indicating compatibility with the selected CPU. In other embodiments, the entries for the RAMs would include other tags such as a size tag. This size tag is used to present to the user a list of compatible RAM sizes offered by the computer system vendor.

In step 616, control provides the list to the user interface 105 which is presented to the user by the user interface. After a selection is made, the user interface provides an indication of the selected RAM to control. Once an indication of a selected RAM size and type has been received, control accesses the master data base 125 to provide a list of operating system types that are compatible with the selected processor and are compatible with the selected RAM size and type. For example, control will only provide operating system types to the user interface 105 that will operate with the selected CPU, and for which the selected RAM has enough capacity to implement the selected operating system. In this embodiment, the entry for each operating system includes at least one processor compatibility tag and at least one RAM size and type tag to indicate compatibility. The list will include a particular operating system type if at least one operating system entry in the master data base includes a tag indicating compatibility with the selected CPU, a tag indicating compatibility with the selected RAM, and a tag indicating that the operating system is of that particular type.

In step 626, the list of compatible operating system types are provided to the user interface to be presented to the user via the user interface. In step 629, control receives an indication of the selected operating system type from the user interface. From this point, control transfers to step 213, where it accesses the master data base to generate a list of versions and languages available for the selected operating system type that are compatible with the selected CPU and the selected RAM.

In other embodiments, a user may select other hardware components to be implemented on a targeted computer system. For example, in one embodiment, the user is presented a list of hard drives compatible with the CPU and operating system selected. In other embodiments, the user is presented with a list or lists of compatible peripheral devices. For example, the present invention may also be used by a purchaser to select a compatible type of modem to be installed in the target computer system as well as the type or types of disk drives or CD ROM drives. Other options that could be presented to a user with the present invention include various types of computer chassis, keyboards, and displays. Each hardware component and software program presented to a user would be compatible with the previous selection or selections made by the user. In some embodiments, each type of hardware component would be presented in sub menu or sub-list. Each of the entries for the additional hardware items would include associated tags which indicate compatibility with previous choices.

When the user makes a selection to implement a particular hardware component such as a type or family of displays, control accesses the master data base to generate a list of the specific models available for that display type. In this embodiment, each model has an entry in the master data base, that includes a part number and a tag indicating that the entry represents a display. Control provides the list of models to the user interface. In other embodiments, the user is presented with multiple option lists for a selected hardware component. To present multiple lists in one embodiment, the entry for the component includes multiple corresponding tag fields. In some embodiments, control would also access the master data base to generate a list of always run parts such as patches, software programs, hardware components, or implementation operations associated with the selected choice. An indication of those items or instructions would be written to the data file. Those items that are optional with the selected choice would be presented for the user to select.

In other embodiments, other steps may be performed in between the steps of FIG. 6 such as writing an indication of a selection to a data file, generating and writing a list of always run parts for each selection to the data file, and generating and presenting lists of optional patches and installation operations offered with the selected choices. The lists of always run parts can be generated either by accessing entries in the master data base 125 or accessing dependency files.

The system of FIG. 1 advantageously brings to the users attention the necessity of selecting particular options based upon a previous selection or selections. For example, if a selected monitor comes in two different colors, the user may be asked which color they prefer. This advantageously ensures that a complete order is generated at the end of the ordering session. In other embodiments, the user may be presented with a default selection (as indicated by a tag in the master database or in a dependency file) and a choice of whether the user wishes to make a substitution for the default selection.

In some embodiments, the order of the entries in the master data base 125 determines the order of the presentation of the lists of options to the user interface 107. For example, in a system that is used to select software programs only, the operating system entries would be at the beginning of the master data base in that the first list of options provided to the user interface is a list of operating system types. For a system that implements the flow diagram of FIG. 6, the entries for the CPUs would be at the beginning of the master data base to ensure that the list of CPU types is presented first. In other embodiments, the master data base includes an order field or tag such as an initiation tag which allows the order of the lists presented to be changed as needed.

In other embodiments, the order of the entries for the implementation operations determine the order that these operations are written to the data file by control and consequently, their order in the data file. In other embodiments, the order that these operations are written to the data file determines the order that they are performed during manufacturing. Consequently, the order of the operations performed during manufacturing is determined by the order of their entries in the master data base. In other embodiments, the entries for the implementation operations in the master data base 125 include an order tag to indicate their order of performance in the manufacturing process. However, in other embodiments, the parser program or other program may rearrange the order of the implementation operations.

In other embodiments, the master data base may include informational tags or description fields that are used by the control computer system to provide text to the user interface 105 to be read by the user. For example, each entry may include a cost field. The control computer system 103 would read this field and send to the user interface an indication of the price of each option for display on the user interface. Control would keep a "running tab" of the total costs of the items selected and would provide the total cost to the user interface for displaying. Other possible types of informational tags include lead time tags indicating the lead time needed for the part, and stock number tags indicating the number of parts in inventory.

The data file or system descriptor record file created from the flow chart beginning in FIG. 6 would be sent to manufacturing wherein a parser would read the data file and process the information according to the prefix. In one embodiment the software program information would be sent to one area of manufacturing and the hardware component information would be sent to another area of manufacturing wherein such information would be used to create an automated program or programs for scheduling and/or controlling the assembly of the hardware components.

FIG. 7 is a block diagram of a second embodiment of a system for generating a compatible order for a computer system and for configuring a computer system according to the compatible order. In this embodiment, the targeted computer system is the computer system that executes a selection program similar to the flow diagrams in FIGS. 2–5.

In FIG. 7, the targeted computer system is booted up with an operating system program on disk 615 which in the embodiment shown is a Factory Installed DOS Application (FIDA) program on a floppy disk. This FIDA program enables the target computer system 605 to invoke a software selection program (similar to that shown in FIGS. 2–5) that is initially stored in manufacturing 610. During this software selection program, the targeted computer system 605 is also the control computer system. The targeted computer system 605 accesses via network connection 620 the master data base as per the software selection program to present lists of software programs that are compatible with the previous selections made by the operator of the targeted computer system 605. In this embodiment, the lists would be displayed on the display screen or other type of user interface of the targeted computer system 605 and the user would indicate their choices via a keyboard, mouse, or other type of user interface input device.

After completing the software selection ordering session and generating a data file such as a system descriptor file, the data file is provided to manufacturing 610. In one embodiment, manufacturing includes other computer programs such as a parser. The targeted computer system, executing the parser program, associates the appropriate shell script with each entry in the SDR and then invokes the shell script program to implement and execute the selected programs and/or operations on the targeted computer system 605. The parser program and executable shell script files are initially stored in a data base in manufacturing 620. In one embodiment, another computer system may run the parser program to load software programs onto a hard disk drive. The hard disk drive is then sent to a customer for use in the targeted computer system.

In other embodiments, the software selection programs (similar to FIGS. 2–5) invoked by the first FIDA disk would include a hardware sniffing program or feature. This hardware sniffing program, when executed on the targeted computer system 605, determines the parameters of the hardware components on the targeted computer system such as determining the size of the targeted computer system's RAM and determining the targeted computer system's type of processor. In one embodiment, this sniffing portion of the software selection program is programmed in assembly language. The information obtained by the sniffing feature enables specific aspects in the software programs to be set as per the configuration of the hardware. For example, specific settings in an installed operating system can be set according to the size of the targeted computer system's RAM.

In one embodiment, the target computer system executes this software sniffing feature to determine the hardware configuration of the targeted computer system 605 so that the lists of software program options or other options presented to the user are compatible with the hardware components of the target computer system 605 as determined by the sniffing feature. In one example, the sniffing feature would determine that the RAM of the targeted computer system is of a particular size. The user would only be presented operating systems that are compatible with the size of the RAM as determined by the sniffing program.

In other embodiments, the computer system executing the software selection program that includes the sniffing feature would be on another computer system other than targeted computer system. For example, in FIG. 1, the control computer system 103 executing the specifying program with sniffing feature, would be able to "remote sniff" the targeted computer system 137 via a computer network such as a LAN or WAN. This advantageously allows the specifying program to present choices that are compatible with the hardware of the targeted computer system 137.

In other embodiments, the sniffing feature is used to select compatible hardware components as well. After the sniffing feature determines the existing basic hardware configuration of the targeted computer system, the user is presented lists of additional hardware components that are compatible with the existing hardware configuration as determined by the sniffing feature.

While particular embodiments have been shown and described, it will be obvious to those skilled in the art that changes and modifications may be made without departing from this invention and its broader aspects and, therefore, the appended claims are to encompass within their scope all such changes and modifications as are within the true spirit and scope of this invention.

What is claimed is:

1. A method for specifying a computer system comprising:
   providing a master data base of a first plurality of options that may be implemented on a computer system;
   presenting to a user via a user interface a list of a second plurality of options that may be implemented on a computer system, the second plurality of options selected from the first plurality of options maintained in the master data base;
   receiving an indication of a selected choice by a user from the second plurality of options presented to the user via the user interface;
   generating, in response to the indication of the selected choice, a list of a third plurality of options that may be implemented on a computer system, the generating step including accessing the master data base, performing a compatibility comparison, and selecting each option of the third plurality of options from the first plurality of options as a function of each option's compatibility with the selected choice, the compatibility comparison including reading a characteristic of each option of the first plurality of options and determining whether the corresponding option represents an option which is compatible with the selected choice;
   presenting to the user via the user interface, the list of the third plurality of options;
   indicating in a computer system readable data file the selection and part number of the selected choice; and
   associating an executable file with the part number of the selected choice, the executable file for use during manufacture of the computer system.

2. The method of claim 1, wherein the selected choice is a specific operating system.

3. The method of claim 1, wherein each of the third plurality of options represents an option offered by a computer system vendor of the selected choice.

4. The method of claim 3, wherein the selected choice is an operating system type and each of the third plurality of options is a specific version of the operating system type.

5. The method of claim 1, wherein at least one of the third plurality of options is a computer software program that may be installed on a computer system.

6. The method of claim 1, wherein at least one of the third plurality of options is a patch.

7. The method of claim 1, wherein at least one of the third plurality of options is a word processing program that may be installed on a computer system.

8. The method of claim 1, wherein the receiving of the indication from the user interface includes receiving the indication via a computer network.

9. The method of claim 8, wherein the computer network is a wide area network.

10. The method of claim 1, wherein the selected choice is a hardware component.

11. The method of claim 1, wherein the selected choice is a specific processor.

12. The method of claim 1, wherein the selection of the selected choice is entered into the user interface via an individual receiving an indication of the selection from a purchaser of the computer system.

13. The method of claim 1, further comprising:
   generating a list of a fourth plurality of options, each of the fourth plurality of options being compatible with the selected choice;
   presenting to the user via the user interface the list of the fourth plurality of options.

14. The method of claim 13, further comprising:
   receiving an indication of at least one selected choice from the third plurality of options;
   wherein each of the fourth plurality of options is compatible with the at least one selected choice from the third plurality of options.

15. The method of claim 1, wherein the user interface includes a telephone.

16. A method for specifying a computer system comprising:
   providing a master data base of a first plurality of options that may be implemented on a computer system;
   presenting to a user via a user interface a list of a second plurality of options that may be implemented on a computer system, the second plurality of options selected from the first plurality of options maintained in the master data base;
   receiving an indication of a selected choice by a user from the second plurality of options presented to the user via the user interface, the selected choice being a software program;
   generating, in response to the indication of the selected choice, a list of a third plurality of options that may be implemented on a computer system, the generating step including accessing the master data base, performing a compatibility comparison, and selecting each option of the third plurality of options from the first plurality of options as a function of each option's compatibility with the selected choice, the compatibility comparison including reading a characteristic of each option of the first plurality of options and determining whether the corresponding option represents an option that is compatible with the selected choice;
   presenting to the user via the user interface, the list of the third plurality of options;
   indicating in a computer system readable data file the selection of the selected choice; and
   installing the software program in a computer system during manufacturing of the computer system according to the data file.

17. A method for specifying a computer system comprising:
- providing a master data base of a first plurality of options that may be implemented on a computer system;
- presenting to a user via a user interface a list of a second plurality of options that may be implemented on a computer system;
- receiving an indication of a selected choice by a user from the second plurality of options presented to the user via the user interface;
- generating, in response to the indication of the selected choice, a list of a third plurality of options that may be implemented on a computer system, the generating step including accessing the master data base, performing a compatibility comparison, and selecting each option of the third plurality of options from the first plurality of options as a function of each option's compatibility with the selected choice;
- presenting to the user via the user interface, the list of the third plurality of options;
- indicating in a computer system readable data file the selection of the selected choice; and
- indicating in the computer readable data file at least one implementation operation required for the implementation of the selected choice in the computer system during manufacturing of the computer system.

18. A method for specifying a computer system comprising:
- providing a master data base of a first plurality of options that may be implemented on a computer system;
- presenting to a user via a user interface a list of a second plurality of options that may be implemented on a computer system;
- receiving an indication of a selected choice by a user from the second plurality of options presented to the user via the user interface;
- generating, in response to the indication of the selected choice, a list of a third plurality of options that may be implemented on a computer system, the generating step including accessing the master data base, performing a compatibility comparison, and selecting each option of the third plurality of options from the first plurality of options as a function of each option's compatibility with the selected choice, the compatibility comparison including reading a characteristic of each option of the first plurality of options and determining whether the corresponding option represents an option that is compatible with the selected choice;
- presenting to the user via the user interface, the list of the third plurality of options; and sniffing a first computer system to determine at least one parameter of the first computer system;
- wherein each option of the third plurality of options is also selected as a function of each option's compatibility with the at least one parameter determined by the sniffing.

19. The method of claim 18, wherein the at least one parameter includes the type of central processing unit in the first computer system.

20. A method for specifying a computer system comprising:
- providing a computer system readable data base of a plurality of options that may be implemented on the computer system;
- providing to a user interface a first list of options, the first list of options obtained from the plurality of options maintained in the computer system readable data base;
- receiving from the user interface an indication of a selected choice from the first list of options presented to the user via the user interface;
- generating, in response to receiving the indication of the selected choice, a second list of options, wherein generating the second list of options includes accessing the computer system readable data base, performing a compatibility comparison, and selecting, from the data base, options that are determined to be compatible with the selected choice;
- providing to the user interface the second list of options;
- receiving from the user interface an indication of at least one selected choice from the second list of options presented to the user via the user interface;
- writing to a computer readable data file an indication of the selected choice from the first list;
- writing to a computer readable data file an indication of the at least one selected choice from the second list;
- associating a first executable file with the indication in the data file of the selected choice from the first list; and
- associating a second executable file with the indication in the data file of the at least one selected choice from the second list, further comprising:
  - executing the first executable file during manufacturing to implement in the computer system the selected choice from the first list; and
  - executing the second executable file during manufacturing to implement in the computer system the at least one selected choice from the second list.

21. A computer system for generating an order for a computer system comprising:
- a computer readable data base including a plurality of entries, each entry representing an option capable of being implemented on a computer system;
- means for providing a list of options to a user interface to be presented to a user via the user interface;
- means for receiving from a user interface an indication of at least one selected choice by a user from a list of options presented to a user via the user interface;
- means for generating a list of compatible options that may be implemented on a computer system, each of the compatible options is compatible with a previously selected choice by a user, wherein generating the list of compatible options includes reading the plurality of entries in the computer readable data base, performing a compatibility comparison to determine whether an entry represents an option that is compatible with the previously selected choice, and selecting, from the data base, options that are determined to be compatible with the previously selected choice;
- means for writing to a computer system readable data file an indication of a selected choice;
- means for implementing the at least one selected choice on a computer system using the computer system readable data file;
- wherein the means for providing provides the list of compatible options to the user interface;
- wherein the means for receiving receives from the user interface an indication of at least one selected choice from the list of compatible options presented to a user via the user interface;
- wherein the means for writing writes to the computer system readable data file an indication of the at least one selected choice from the list of compatible options;

wherein the means for implementing includes means for associating an executable file with the indication of the at least one selected choice and includes means for executing the executable file during manufacturing to implement the at least one selected choice on the computer system.

22. The computer system of claim 21, wherein the at least one selected choice includes a software program.

23. The computer system of claim 21, wherein the list of compatible options is provided to the user interface via a wide area network (WAN) computer network, wherein the indication of the at least one selected choice is received from the user interface via the WAN computer network.

\* \* \* \* \*